(No Model.) 2 Sheets—Sheet 1.

H. BROOKE.
GLASS MOLD.

No. 364,211. Patented June 7, 1887.

Witnesses
R. J. van Boskerck
Mary Sheridan

Inventor
Homer Brooke
Per Frost + Coe
Attorneys (No Model.) 2 Sheets—Sheet 2.
H. BROOKE.
GLASS MOLD.
No. 364,211. Patented June 7, 1887.
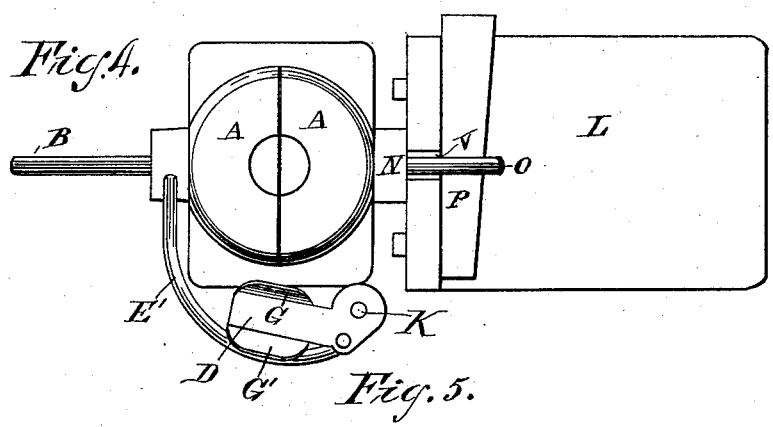
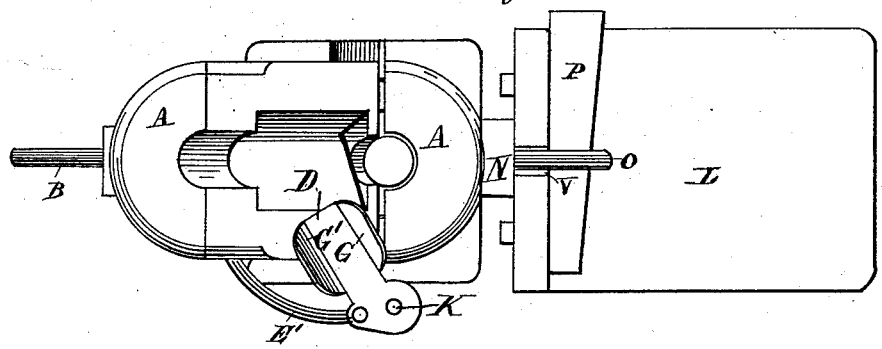
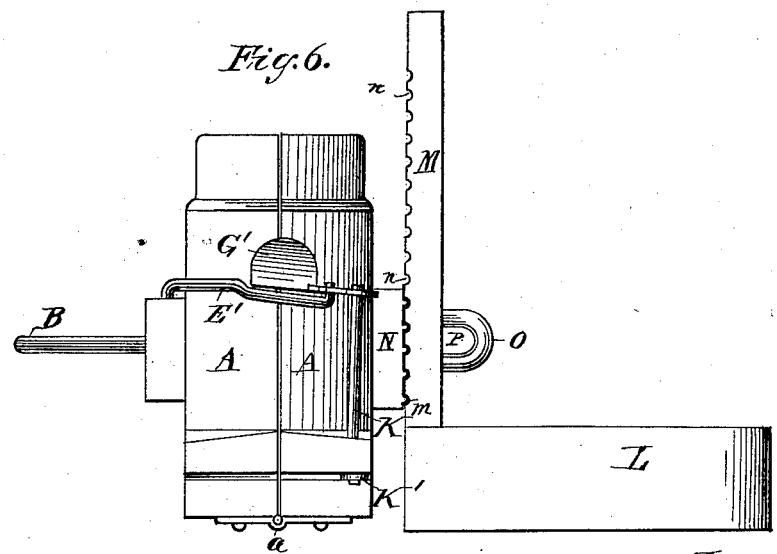

UNITED STATES PATENT OFFICE.

HOMER BROOKE, OF JERSEY CITY, NEW JERSEY.

GLASS-MOLD.

SPECIFICATION forming part of Letters Patent No. 364,211, dated June 7, 1887.

Application filed July 29, 1886. Serial No. 209,382. (No model.)

*To all whom it may concern:*

Be it known that I, HOMER BROOKE, a citizen of the United States, residing at Jersey City, county of Hudson, State of New Jersey, have invented a new and useful Improvement in Glass-Molds, of which the following, taken in connection with the accompanying drawings, is a full, clear, and accurate description.

In preparing glass for blowing bottles and other articles in molds, the glass-blower, in lifting the roll of hot glass from a horizontal to a perpendicular position in order to place it in the mold, finds that the weight of the mass of glass causes it to become elongated and thickened at the lower end. To remedy this defect he has been accustomed to pat the bottom of the mass of glass on any convenient flat surface, as the top of the mold or a brick. This, which is technically called "end-setting," however, although it flattens the end of the roll of glass, distributes the glass unevenly, so that when blown the portion formed out of the flat end has an undue thickness. No specific means, platform, or place has heretofore been provided in connection with the mold for end-setting the glass. Another disadvantage attending this way of end-setting is what is technically called "heel trappings" or the formation of a ridge on the bottom of the article blown.

One of the objects of my improved mold is to combine therewith so as to form a part of said mold an end-set station or platform, and also to combine with such end-set a former, which, in the act of end-setting the glass, also forms it somewhat to the shape of the article to be blown, distributing the glass and thereby avoiding the undue thickening and heel trapping spoken of.

Figure 1:
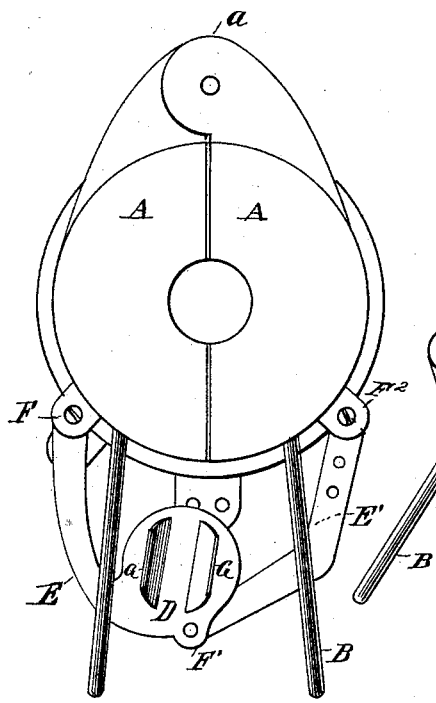
Figure 2:
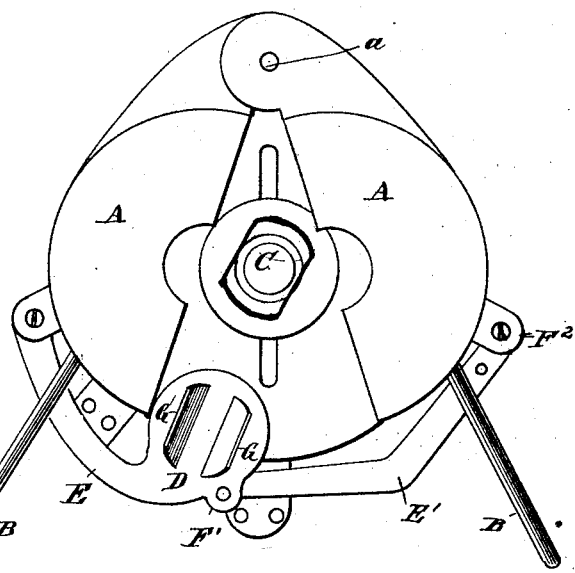
Figure 3:
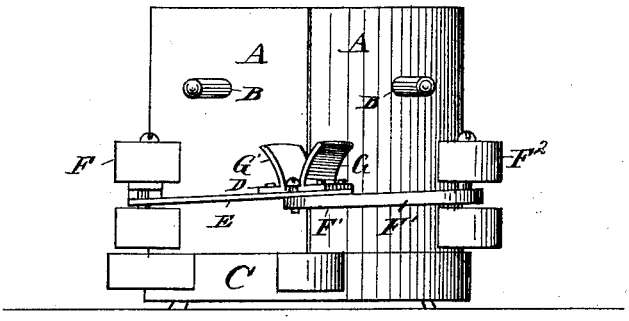

In the drawings, Figure 1 represents a plan view of my improved mold with end-setter and former attached to a glory-hole mold, said mold being closed. Fig. 2 represents the same, the mold being open. Fig. 3 represents a vertical view of the same. Fig. 4 represents a plan view of a bench or foot mold with my improved end-setter and former attached. Fig. 5 is a similar view of the same showing the mold open. Fig. 6 is a vertical view of the same with the mold closed.

Similar parts are represented in these figures by similar letters.

A A show two sides or parts of the mold, hinged at *a*.

B B are the handles for opening and closing the molds.

C is the bottom of the mold.

D is a platform or end-setter. This end-setter D, in Figs. 1, 2, and 3, is attached to the arm E, which is hinged or pivoted at one end to one side of the mold at F, and the other side of the end-setter to a similar arm, E', at F', being hinged or pivoted to the other side of the mold at F².

In Figs. 4, 5, and 6 the end-setter D is shown attached to a rod, K, fastened upon a plate, K', which is pivoted or hinged to the bottom of the mold, and said end-setter D is also hinged or pivoted to the bar or rod E', the other end of which is hinged or pivoted to the other side of the mold. On the end-setter D, and attached thereto, are placed the two sides or projections G G', making a former.

The bars or rods E E' and K are of such relative proportions and shapes that when the mold is opened the end-setter D, with its former, is always brought into just such a position as regards the interior of the mold that the glass can be end-set and formed, and then at once placed by a horizontal movement in the mold to be blown, while the closing of the mold automatically removes the end-setter and former out of the way.

I do not wish or intend to confine myself to the mechanism shown in the drawings to accomplish this operation of the end-setter and former; but any proper means by which the end-setter and former are so attached to the mold that the opening of the mold will bring them in right position for end-setting and forming the glass, and for then placing it in the mold to be blown, while the closing of the mold removes such end-setter and former out of the way, is composed within the scope of my invention. I also wish it understood that I do not intend to confine myself to the shape of the formers shown attached to the end-setters in the drawings, such formers being merely shown as examples and practical ways of carrying out my invention, it being my intention to vary the shape of each former according to the shape and nature of the article to be blown.

Having thus described my invention, what I claim, and desire to secure by Letters Patent, is—

1. In combination with glass-molds, an end-set platform or station for end-setting the glass and partially distributing the same.

2. In combination with glass-molds, an end-set platform or station provided with a former adapted to the shape of the article to be blown, for the end-setting and partially distributing and forming the same.

3. In combination with glass-molds, an end-set platform or station for end-setting the glass to be molded and partially distributing the same, such end-set station being so arranged in relation to the mold that the opening of the mold will bring the station in proper position for use and the closing of the mold will remove such station out of the way.

4. In combination with glass-molds, an end-set platform or station provided with a former adapted to the shape of the article to be blown, for end-setting and partially distributing and forming the same, and so arranged in relation to the mold that the opening of the mold will bring said end-set station and former into proper position for use, while the closing of the mold will remove it out of the way.

In testimony whereof I have hereunto set my hand this 28th day of July, 1886.

HOMER BROOKE.

In presence of—
CHARLES G. COE,
R. F. VAN BOSKERCK.